United States Patent [19]

Kuen

[11] Patent Number: 5,178,125
[45] Date of Patent: Jan. 12, 1993

[54] MULTIFUNCTIONAL WATER BOILING AND STEAM WARMING DEVICE

[75] Inventor: Lee M. Kuen, Taipei, Taiwan
[73] Assignee: Hui-Ling Chiu, Taipei, Taiwan
[21] Appl. No.: 828,044
[22] Filed: Jan. 30, 1992
[51] Int. Cl.[5] ............................................. A21B 1/08
[52] U.S. Cl. ..................... 126/20.2; 99/467; 126/20; 126/20.1; 126/369; 126/369.1
[58] Field of Search ............... 126/369, 369.1, 5, 20, 126/20.1, 20.2; 99/516, 467

[56] References Cited

U.S. PATENT DOCUMENTS

| | | | |
|---|---|---|---|
| 2,562,723 | 7/1951 | Keller | 126/369 |
| 2,737,881 | 3/1956 | Turner | 126/369.1 X |
| 4,823,767 | 4/1989 | Wüst | 126/20 |

Primary Examiner—Edward G. Favors
Attorney, Agent, or Firm—Browdy and Neimark

[57] ABSTRACT

A multifunctional water boiling and steaming device wherein the steam produced when boiling the water in a heating room is guided by a resisting tube into a steaming chamber to heat the food contained therein and wherein the boiled water flows through a cooling tube and is cooled therein into warm water, the cooling tube being disposed in the steaming chamber to conduct the heat to the steaming chamber to warm the same, whereby the heat of the steam and the boiled water can be recovered and utilized.

1 Claim, 2 Drawing Sheets

5,178,125

MULTIFUNCTIONAL WATER BOILING AND STEAM WARMING DEVICE

BACKGROUND OF THE INVENTION

The present invention relates to a multifunctional water boiling and steam warming device, wherein the steam produced when boiling the water is guided by a resisting tube into a steaming chamber and the heat of the boiled water is conducted into the steaming chamber during cooling procedure whereby the heat can be recovered and utilized to warm the food contained therein.

Conventional water boiling and warming device is widely used. However, during the boiling and cooling procedure, a large amount of heat is dissipated into the air. Therefore, a water boiling and warming device which can recover and utilize the heat is needed.

SUMMARY OF THE INVENTION

It is therefore a primary object of this invention to provide a multifunctional water boiling and steam warming device wherein a boiled water tank is partitioned by a metal plate into a heating room and a warming room whereby the heat in the heating room can be conducted through the metal plate into the warming room to keep the water contained therein at a high temperature.

It is a further object of this invention to provide the above device wherein the steam produced when boiling the water is guided by a resisting tube into a steaming chamber so as to recover the heat of the steam and use the heat to heat the food contained in the steaming chamber.

It is still a further object of this invention to provide the above device wherein a cooling tube is disposed in the steaming chamber whereby the heat of the boiled water is conducted to the steaming chamber during cooling procedure to warm the food contained therein.

DETAILED DESCRIPTION OF THE PREFERRED EMBODIMENT

Figure 1:
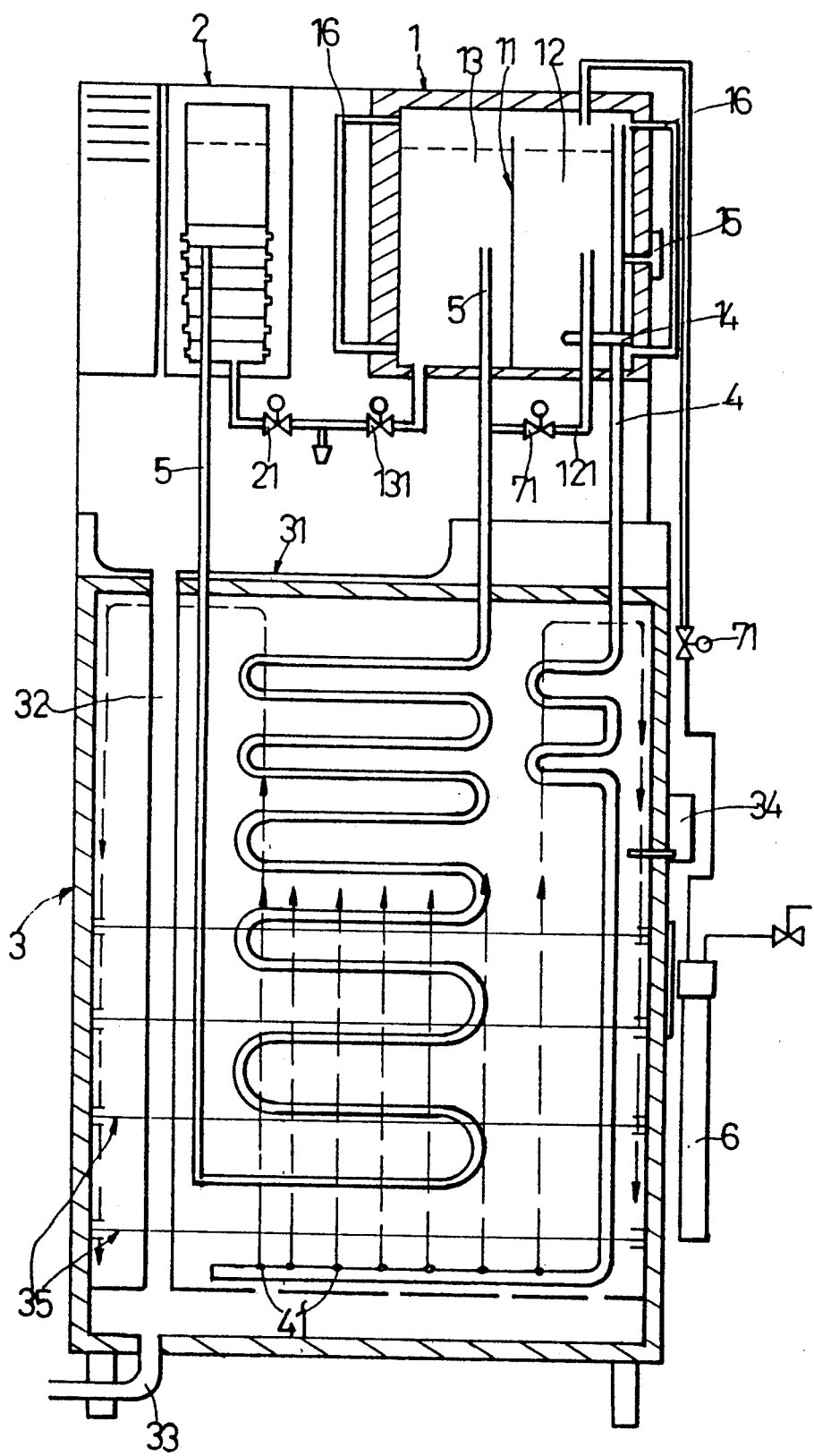
FIG. 1 is a longitudinal sectional view of this invention.
Figure 2:
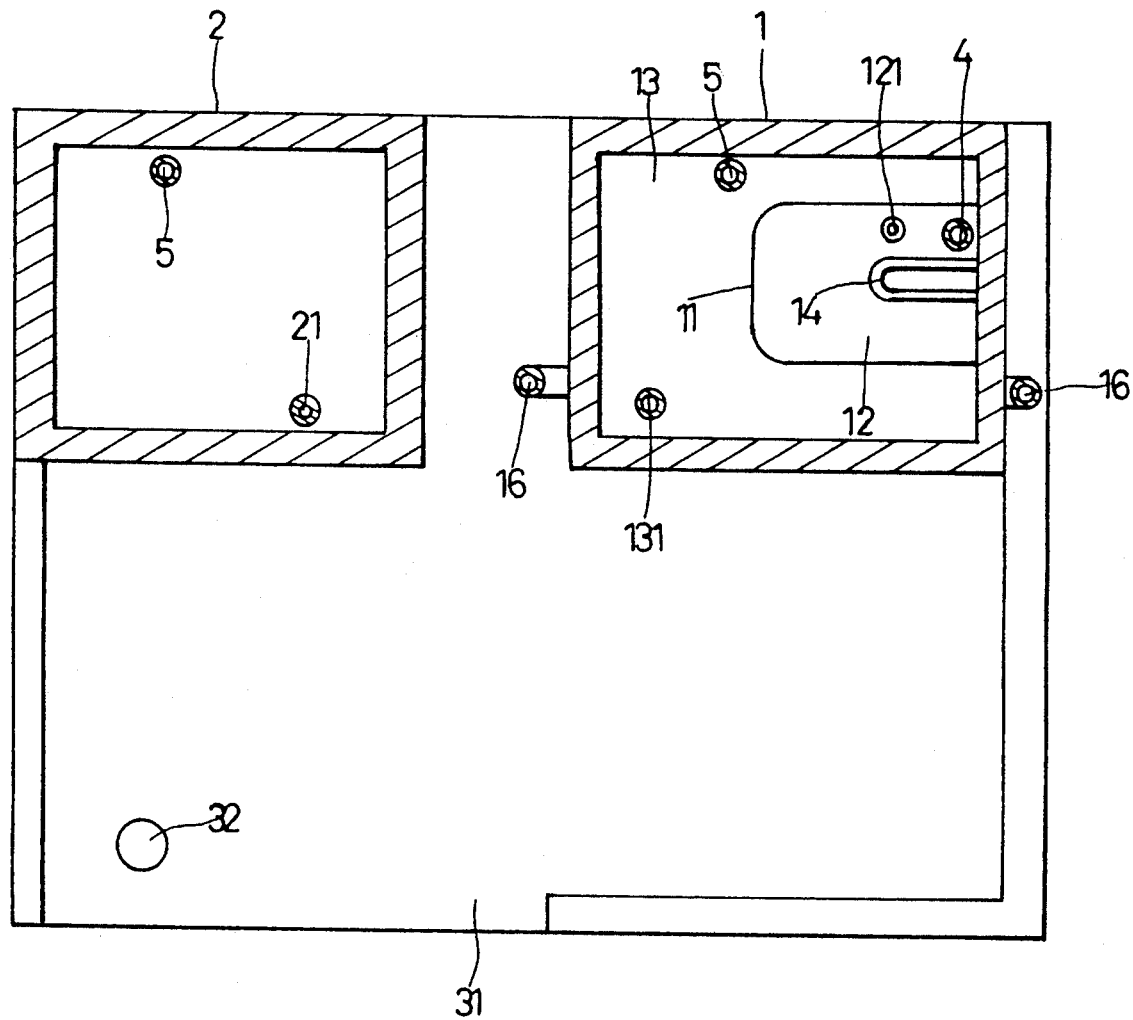
FIG. 2 is a cross-sectional view thereof.

Please refer to FIGS. 1 and 2. The present invention includes a boiled water tank 1, a warm water tank 2, a steaming chamber 3, a resisting tube 4 and a cooling tube 5, wherein the boiled water tank 1 and warm water tank 2 are disposed above the steaming chamber 3 and the boiled water tank 1 is partitioned by a U-shaped metal plate 11 into a boiled water heating room 12 and a boiled water warming room 13. The heat in the heating room 12 can be conducted through the metal plate 11 into the warming room 13 to keep the water conatined in the warming room 13 at a high temperature. A heater 14 is disposed in the heating room 12 to heat and boil the water in the heating room 12 and a water temperature controller 15 is disposed beside the heating room 12 to insure that the water is actually boiled before the heating is stopped. A boiled water conduit 121 is connected with the heating room 12 so that the boiled water can flow through the heating room 12 therethrough. A controlling valve 72 is disposed on the conduit 121 whereby after the water is boiled, the valve 72 is opened, permitting the boiled water to flow out. One end of the conduit 121 is connected to the cooling tube 5. One end of the cooling tube 5 is disposed in the warming room 13 and the other end thereof is disposed in the warm water tank 2 whereby when the controlling valve 72 is opened, the boiled water flows into the warming room 13 and the warm water tank 2. The cooling tube 5 is windingly disposed in the steaming chamber 3 to cool the boiled water and make the heat of the boiled water conducted into the steaming chamber 3 to produce warming effect. A boiled water outlet valve 131 is disposed at the bottom of the warming room 13 to control the discharge of the boiled water. A warm water outlet valve 21 is disposed at the bottom of the warm water tank 2 to control the discharge of the warm water. Two water level meters 16 are located in the heating room 12 and warming room 13 for the user to observe the left water level.

The resisting tube 4 has one end opening located above the boiled water tank 1 and is windingly disposed in the steaming chamber 3. An end horizontal portion of the resisting tube 4 is formed with multiple steam outlets 41 facing upward. The steam in the boiled water tank 1 is guided through the resisting tube 4 and discharged from the steam outlets 41 into the steaming chamber 3 and form convection effect to heat the food by means of the heat of the steam.

The steaming chamber 3 has a plane top stage 31 for placing cup or the like thereon. The top stage 31 is connected with a draining pipe 32 to drain the water in the stage 31. Moreover, when the steam in the steaming chamber 3 is increased and the pressure therein is enlarged, while the steam can not be properly discharged, the draining pipe 32 permits the steam to discharge therethrough to ensure security. Another draining pipe 33 is disposed at the bottom of the steaming chamber 3 to drain the water formed by condensed steam and the water discharged from the draining pipe 32. A temperature controller 34 is disposed beside the steaming chamber 3 to control the temperature therein to reach a predetermined value. Several article supports 35 are disposed in the steaming chamber 3 for placing food thereon to be heated or warmed.

When used, the raw water is first filtered by a filter 6 and then is controlled by the controlling valve 71 to flow from the top of the boiled water tank 1 into the heating room 12 to be heated by a proper amount and at a proper time. When the raw water is boiled, the controlling valve 72 is opened, permitting the boiled water to flow into the warming room 13 and the warm water tank 2 and stored therin. When the boiled water flows through the cooling tube 5, the heat thereof is conducted into the warm water tank 3 for keeping the water contained therein warm. In addition, the steam produced when boiling the water in the boiled water tank 1 will be guided by the resisting tube 4 to flow from the bottom of the steaming chamber 3 into the steaming chamber 3 to form convection effect to heat the food placed therein.

What is claimed is:

1. A multifunctional water boiling and steam warming device comprising a boiled water tank, a warm water tank, a steaming chamber, a resisting tube and a cooling tube, characterized in that said boiled water tank and warm water tank are disposed above the steaming chamber and said boiled water tank is partitioned by a U-shaped metal plate into a heating room and a warming room, whereby the boiled water flows through and out of a boiled water conduit disposed in said heating room and is controlled by a controlling valve disposed on said conduit, and when said controlling valve is opened, the boiled water flows through said cooling tube connecting with said conduit into said warming room and warm water tank and stored therein, one end opening of said resisting tube being disposed at the top of siad boiled water tank, said resisting tube being windingly disposed in said steaming chamber, a end horizontal portion of said resisting tube being formed with multiple steam outlets facing upward, whereby the steam in said boiled water tank is guided by said resisting tube into said steaming chamber to heat the food contained therein, said warming room and said warm water tank being connected by said cooling tube which is windingly disposed in said steaming chamber whereby the heat of the boiled water during cooling procedure will be dissipated to warm the food contained in said steaming chamber.

* * * * *